(12) United States Patent
Watanabe et al.

(10) Patent No.: US 12,499,464 B2
(45) Date of Patent: Dec. 16, 2025

(54) MANAGEMENT SYSTEM

(71) Applicant: GUNZE LIMITED, Kyoto (JP)

(72) Inventors: Nobuhiro Watanabe, Moriyama (JP); Ibuki Shimazaki, Moriyama (JP)

(73) Assignee: GUNZE LIMITED, Kyoto (JP)

( * ) Notice: Subject to any disclaimer, the term of this patent is extended or adjusted under 35 U.S.C. 154(b) by 0 days.

(21) Appl. No.: 18/262,272

(22) PCT Filed: May 11, 2023

(86) PCT No.: PCT/JP2023/017806
§ 371 (c)(1),
(2) Date: Jul. 20, 2023

(87) PCT Pub. No.: WO2023/238599
PCT Pub. Date: Dec. 14, 2023

(65) Prior Publication Data
US 2024/0037590 A1  Feb. 1, 2024

(30) Foreign Application Priority Data
Jun. 10, 2022  (JP) .................. 2022-094229

(51) Int. Cl.
*G06Q 30/0208* (2023.01)
*G06Q 30/018* (2023.01)

(52) U.S. Cl.
CPC ....... *G06Q 30/0208* (2013.01); *G06Q 30/018* (2013.01)

(58) Field of Classification Search
CPC .......... G06Q 30/0208; G06Q 30/018

USPC ..................................... 705/14.11
See application file for complete search history.

(56) References Cited

U.S. PATENT DOCUMENTS

| | | | |
|---|---|---|---|
| 2004/0039684 A1 | 2/2004 | Sandor | |
| 2004/0054516 A1 | 3/2004 | Oyasato et al. | |
| 2022/0270112 A1 | 8/2022 | Sahara | |

(Continued)

FOREIGN PATENT DOCUMENTS

| | | |
|---|---|---|
| JP | 2004-038268 A | 2/2004 |
| JP | 2006-505027 A | 2/2006 |
| JP | 2006-134084 A | 5/2006 |

(Continued)

OTHER PUBLICATIONS

Steve Hardman, How do Plastic Credits Work?, 2021 (Year: 2021).*

(Continued)

*Primary Examiner* — Tarek Elchanti
(74) *Attorney, Agent, or Firm* — Studebaker Brackett PLLC

(57) ABSTRACT

There is provided a management system including a first calculation unit, a second calculation unit, a storage unit, and a credit management unit. The first calculation unit calculates an increase amount of credit based on the purchase mass and the parameter representing the degree of reduction in environmental load in accordance with the purchase of plastic materials. The second calculation unit calculates a decrease amount of credit in accordance with either the transfer or production of the product. The storage unit stores an initial balance. The credit management unit updates a credit balance based on the initial balance, the increase amount, and the decrease amount.

18 Claims, 14 Drawing Sheets

(56) References Cited

U.S. PATENT DOCUMENTS

2023/0065649 A1* 3/2023 Hawkins .................. C08J 9/36

FOREIGN PATENT DOCUMENTS

| JP | 2006-252271 A | | 9/2006 | |
|----|---------------|---|--------|---|
| JP | 2007-141221 A | | 6/2007 | |
| JP | 2010-191832 A | | 9/2010 | |
| KR | 20040002787 A | * | 1/2004 | ............ G06Q 10/08 |
| WO | 2004/010366 A2 | | 1/2004 | |
| WO | 2021/144994 A1 | | 7/2021 | |

OTHER PUBLICATIONS

International Search Report issued in PCT/JP2023/017806; mailed Jul. 18, 2023.
Written Opinion issued in PCT/JP2023/017806; mailed Jul. 18, 2023.
"Decision to Grant a Patent" Office Action issued in JP 2022-098978; mailed by the Japanese Patent Office on Jul. 26, 2022.
Plastics Smart; "Biomass Certification by Mass Balance Approach"; http://www.env.go.jp/recycle/ref072830_1.pdf; total 43 pages; with partial English language translation.
Christian Kruger et al.; "Biomass Balance: An Innovative and Complementary Method for Using Biomass as Feedstock in the Chemical Industry"; 2018; pp. 101-107; https://doi.org/10.1007/978-3-319-66981-6_12.
"Environmental management Life cycle assessment Principles and framework"; JIS Q 14040:2010 (ISO 14040:2006); total 10 pages.

* cited by examiner

| PRODUCT NUMBER | REDUCTION PARAMETER (%) | SPECIFIC GRAVITY |
|---|---|---|
| pla-1 | 35 | 0.95 |
| pla-2 | 10 | 1.1 |
| pla-3 | 0 | 1.2 |
| . . . | . . . | . . . |
| pla-n | 45 | 0.93 |

| FILM NAME: pf-1 | | | | |
|---|---|---|---|---|
| RAW MATERIAL | MASS RATIO (%) | | | |
| pla-1 | 70 | | | |
| pla-2 | 0 | | | |
| pla-3 | 30 | | | |
| ... | ... | | | |
| pla-n | 0 | | | |
| STANDARD No | THICKNESS (μm) | WIDTH (mm) | LENGTH (m) | SPECIFIC GRAVITY |
| 1 | 30 | 1000 | 20 | 1.025 |
| 2 | 20 | 1000 | 30 | 1.025 |
| ... | ... | ... | ... | ... |

| FILM NAME: pf-1 | | | | | |
|---|---|---|---|---|---|
| STANDARD No.1 | | | | | |
| PRODUCTION LOT NUMBER | THICKNESS (μm) | WIDTH (mm) | LENGTH (m) | SPECIFIC GRAVITY | INVENTORY QUANTITY (ROLLS) |
| 12345 | 30 | 1000 | 20 | 1.025 | 100 |
| 12346 | 30 | 1000 | 20 | 1.025 | 110 |
| ... | ... | ... | ... | ... | ... |

| FILM NAME: pf-1   PRODUCTION LOT NUMBER: ||||||
|---|---|---|---|---|---|
| THICKNESS (μm) | WIDTH (mm) | LENGTH (m) | SPECIFIC GRAVITY | MASS (t) | PRODUCTION QUANTITY (ROLLS) |
| 30 | 1000 | 20 | 1.025 | 0.000615 | 50 |

T1

| REDUCTION PARAMETER (%) | QUANTITY (ROLLS) | MASS (t) |
|---|---|---|
|  |  |  |
|  |  |  |
| ... | ... | ... |
| TOTAL |  |  |

T2

CURRENT CREDIT BALANCE: ___

FILM NAME: pf-1   PRODUCTION LOT NUMBER: 12345

| THICKNESS (μm) | WIDTH (mm) | LENGTH (m) | SPECIFIC GRAVITY | MASS (t) | PRODUCTION QUANTITY (ROLLS) |
|---|---|---|---|---|---|
| 30 | 1000 | 20 | 1.025 | 0.000615 | 50 |

T1

| REDUCTION PARAMETER (%) | QUANTITY (ROLLS) | MASS (t) |
|---|---|---|
| 0 | 30 | 0 |
| 15 | 30 | 0.002768 |
| 50 | 40 | 0.0123 |
| TOTAL | 100 | 0.015068 |

T2

CURRENT CREDIT BALANCE: ___

F3

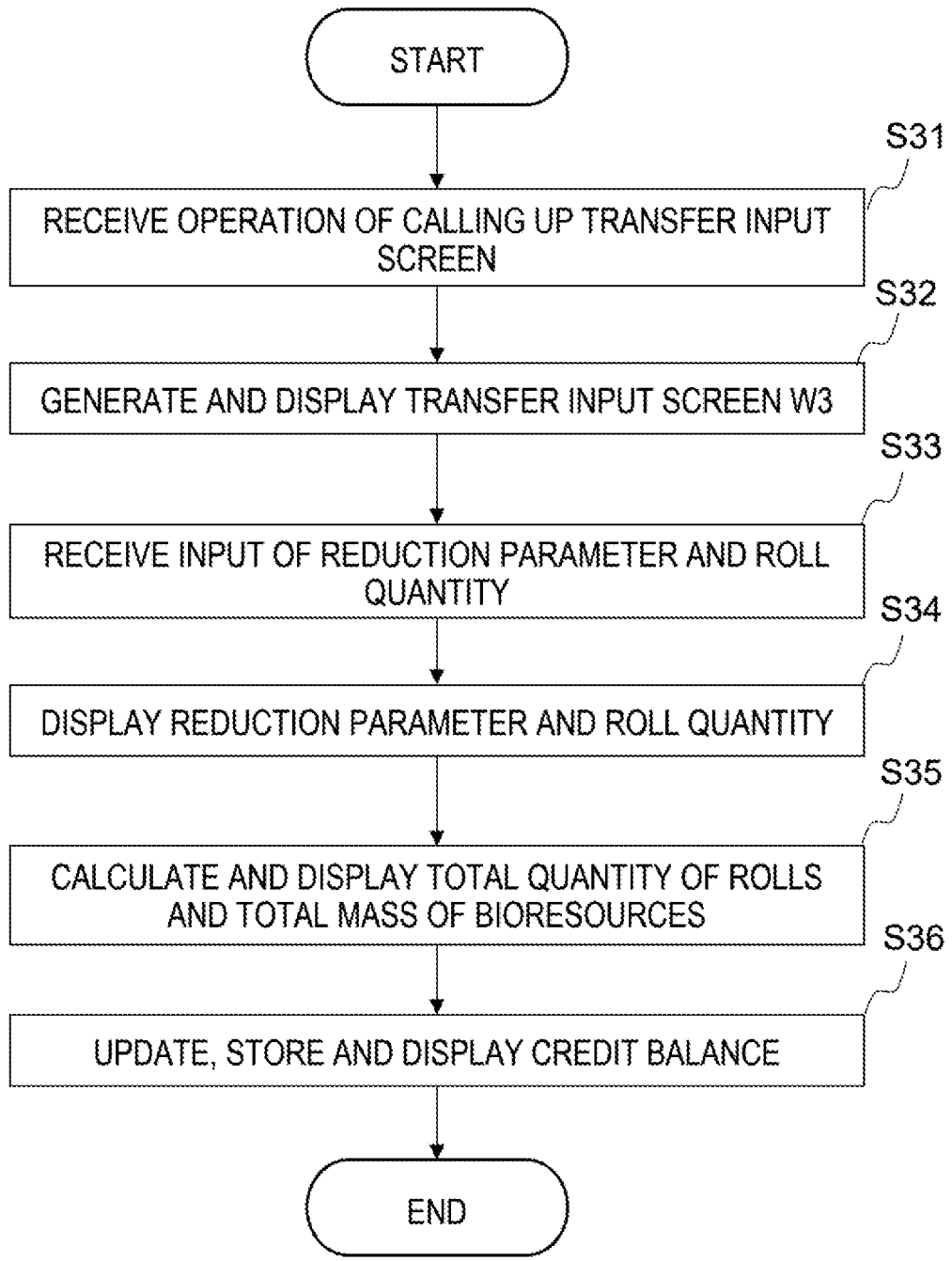

| FILM NAME: pf-1   PRODUCTION LOT NUMBER: 12345 |||||||
|---|---|---|---|---|---|---|
| PRODUCTION LOT NUMBER: 12345 |||||||
| THICKNESS (µm) | WIDTH (mm) | LENGTH (m) | SPECIFIC GRAVITY | MASS (t) | INVENTORY QUANTITY (ROLLS) ||
| 30 | 1000 | 20 | 1.025 | 0.000615 | 50 ||

T3

| REDUCTION PARAMETER (%) | QUANTITY (ROLLS) | MASS (t) |
|---|---|---|
| 0 | 5 | 0 |
| 15 | 15 | 0.001384 |
| 50 | 30 | 0.009225 |
| TOTAL | 50 | 0.010609 |

T4

CURRENT CREDIT BALANCE: ___

MANAGEMENT SYSTEM

TECHNICAL FIELD

The present disclosure relates to a management system, a management method and a management program.

BACKGROUND ART

One of the efforts to reduce the environmental load on the global environment is to manufacture plastic products using environment-friendly materials as raw materials. Examples of environment-friendly materials include, for examples, bioresources (organic resources derived from plants and animals), biodegradable materials, recycled raw materials recycled from plastic products, and materials with substantively reduced greenhouse gas emissions related to their manufacture. Environment-friendly materials may also include materials that correspond to two or more of the above categories.

One approach for promoting the above efforts is the mass balance method. The mass balance method, as disclosed in Non-Patent Document 1, for example, is a method of calculating the amount of bioresources used in relation to the amount of final products shipped and assigning this amount of use to specific products when products are produced using bioresources and fossil resources such as oil and coal as raw materials. According to the mass balance method, it is possible to state that bioresources are used for specific products without having to prepare and manage separate production lines to distinguish between products that contain bioresources as raw materials and products that do not.

CITATION LIST

Non-Patent Document

Non-Patent Document 1: http://www.env.go.jp/recycle/ref0728301.pdf

SUMMARY OF THE INVENTION

Problems to be Solved by the Invention

As exemplified in Non-Patent Document 1, in the mass balance method, management from the raw materials including bioresources to the final product is exercised in order to ensure the amount of bioresources used that is assigned to a specific product. Here, the mass balance method can be applied not only to bioresources, but also to biodegradable materials, recycled raw materials recycled from plastic products or intermediates, and materials with substantively reduced greenhouse gas emissions in their production. In order to use such materials and ensure the reduction amount of environmental load assigned to products according to the mass balance method, a system is required to facilitate the management of the reduction amount of environmental load associated with the materials and products.

An object of the present disclosure is to provide a management system, a management method, and a management program for facilitating the management of the reduction amount of environmental load according to the mass balance method.

Means for Solving the Problem

A management system according to a first aspect of the present disclosure includes a first calculation unit, a second calculation unit, a storage unit, and a credit management unit. The first calculation unit calculates, according to a purchase of one or a plurality of types of plastic materials during a predetermined period of time, an increase amount of credit that quantifies a reduction amount in an environmental load based on a purchase mass of each of the types of the plastic materials and a parameter that represents a degree of reduction in the environmental load for each of the types. The second calculation unit calculates a decrease amount of the credit according to either a transfer or production of a product containing the one or the plurality of types of plastic materials as a raw material during the predetermined period of time. The storage unit stores an initial balance of the credit at a beginning of the predetermined period of time. The credit management unit updates a balance of the credit based on the initial balance, the increase amount, and the decrease amount. The second calculation unit is configured to calculate the decrease amount based on a mass of a product to be transferred during the predetermined period of time and the parameter assigned to the product to be transferred, or calculate the decrease amount based on a mass of a product to be produced during the predetermined period of time and the parameter assigned to the product to be produced.

A management system according to a second aspect of the present disclosure is the management system according to the first aspect, wherein the parameter is at least one of a biomass degree, a content of a recycled raw material, a content of a biodegradable material, and a substantive greenhouse gas emission reduction amount related to production of the plastic material.

A management system according to a third aspect of the present disclosure is the management system according to the first aspect or the second aspect, wherein the product is a plastic film.

A management system according to a fourth aspect of the present disclosure is the management system according to any one of the first aspect to the third aspect, wherein the second calculation unit further calculates a mass of the plastic film to be transferred based at least on a thickness, a width, a length, and a specific gravity of the plastic film.

According to the fourth aspect, the mass of the product to be transferred can be easily calculated based on existing data on product management without directly measuring the mass of the product. In addition, there is no need to take into account the mass of a secondary material accompanying the product, and the complicated work for identifying these materials can be omitted.

A management system according to a fifth aspect of the present disclosure is the management system according to any one of the first aspect to the fourth aspect, wherein the second calculation unit further calculates a mass of the plastic film to be produced based at least on a thickness, a width, a length, and a specific gravity of the plastic film.

According to the fifth aspect, the mass of the product to be produced can be easily calculated based on existing data on production of product without directly measuring the mass of the product. In addition, there is no need to take into account the mass of a secondary material accompanying the product, and the complicated work for identifying these materials can be omitted.

A management system according to a sixth aspect of the present disclosure is the management system according to any one of the first aspect to the fifth aspect, further including an input reception unit that receives an input of one or more of the parameters to be assigned respectively to the plastic films to be transferred. The second calculation unit calculates the decrease amount based at least on a thickness, a width, a length, and a specific gravity of the plastic film to which one of the parameters is assigned, and the one of the parameters.

According to the sixth aspect, the parameter can be set for each product at a point of time of transferring the product, so that it is possible to provide a flexible response based on the current credit balance. In addition, since the decrease amount is calculated based at least on the parameter set via the input reception unit and the thickness, the width, the length, and the specific gravity, credit management is easy.

A management system according to a seventh aspect of the present disclosure is the management system according to any one of the first aspect to the sixth aspect, further including an input reception unit that receives an input of one or more of the parameters to be assigned to each of the plastic films to be produced. The second calculation unit calculates the decrease amount based at least on a thickness, a width, a length, and a specific gravity of the plastic film to which one of the parameters is assigned, and the one of the parameters.

According to the seventh aspect, the parameter can be set for each product at the time point of producing the product, so that it is possible to provide a flexible response based on the current credit balance. In addition, since the decrease amount is calculated based at least on the parameter set via the input reception unit and the thickness, width, length, and specific gravity of the plastic film, credit management is easy.

A management system according to an eighth aspect of the present disclosure is the management system according to any one of the first aspect to the seventh aspect, wherein the storage unit further stores product information in which identification information identifying a predetermined unit to which the plastic film belongs, the parameter assigned to the plastic film, and a thickness, a width, a length, and a specific gravity of the plastic film are associated with one another.

According to the eighth aspect, credit management can be linked or integrated with an existing product management system (production management system, inventory management system, etc.). In addition, product traceability can be easily ensured.

A management system according to a ninth aspect of the present disclosure is the management system according to any one of the first aspect to the eighth aspect, further including an output unit that outputs the product information to a physical label.

According to the ninth aspect, product traceability can be more reliably ensured.

A management method according to a tenth aspect of the present disclosure is executed by one or a plurality of computers connected to a storage device, including the following. In addition, a non-transitory computer readable medium according to an eleventh aspect of the present disclosure stores a management program for causing one or a plurality of computers connected to a storage device to execute the following:

calculating, according to a purchase of one or a plurality of types of plastic materials during a predetermined period of time, an increase amount of credit that quantifies a reduction amount in an environmental load based on a purchase mass of each of the types of the plastic materials and a parameter that represents a degree of reduction in the environmental load for each of the types;

calculating a decrease amount of the credit in response to either a transfer or production of a product containing the one or the plurality of types of plastic materials as a raw material during the predetermined period of time;

storing an initial balance of the credit at a beginning of the predetermined period of time in the storage device; and updating a balance of the credit based on the initial balance, the increase amount, and the decrease amount.

Moreover, calculating the decrease amount of the credit refers to calculating the decrease amount based on a mass of a product to be transferred during the predetermined period of time and the parameter assigned to the product to be transferred, or referring to calculating the decrease amount based on a mass of a product to be produced during the predetermined period of time and the parameter assigned to the product to be produced.

Advantages of the Invention

The present disclosure introduces the concept of credit, which quantifies the reduction amount of an environmental load. In the present disclosure, credit is treated as increasing in accordance with the purchase of materials that reduce an environmental load and decreasing in accordance with the transfer or production of products containing the materials as raw materials. The credit balance is then updated based on the credit increase amount calculated in accordance with the purchase of the materials and the credit decrease amount calculated in accordance with the transfer or production of the products. This makes it easy to manage the amount of possible reduction in environmental load, the reduction amount of the environmental load to be certified as realized, and the reduction amount of the environmental load that can currently be assigned to a product through existing business activities such as the purchase of materials and the transfer or production of the product.

BRIEF DESCRIPTION OF THE DRAWINGS

FIG. 2 is a diagram illustrating an example of a material information database.

FIG. 3 is a diagram illustrating an example of production information.

FIG. 4 is a diagram illustrating an example of inventory information.

FIG. 8A is a diagram illustrating an example of a production input screen.

FIG. 8B is a diagram illustrating an example of the production input screen.

FIG. 9 is a flowchart illustrating an operation flow of the management system according to transfer.

FIG. 10B is a diagram illustrating an example of the transfer input screen.

FIG. 12A is a diagram illustrating an example of a label output screen.

EMBODIMENTS OF THE INVENTION

The following describes a management system, a management method, and a management program according to one embodiment of the present disclosure with reference to the drawings.

<1. Configuration of Management System>

Figure 1:
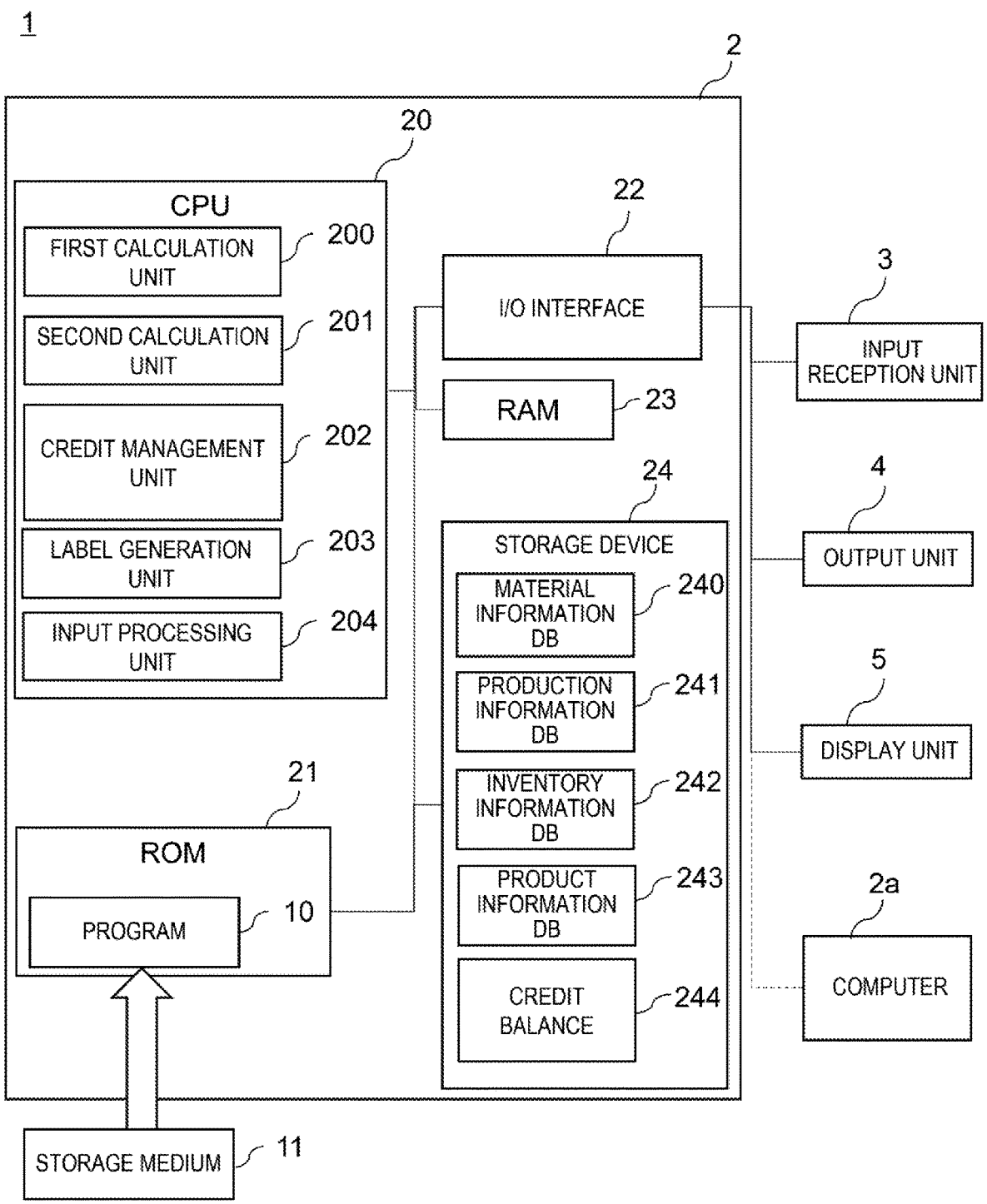
FIG. 1 is a block diagram illustrating an electrical configuration of a management system according to one embodiment.

FIG. 1 is a block diagram illustrating an electrical configuration of a management system 1 according to the present embodiment. The management system 1 is a system for easily managing the reduction amount of an environmental load (credit) according to the mass balance method in business activities such as material purchase, production and transfer of plastic products. The management system 1 may be configured, for example, as at least one of the following: a procurement management system for managing the material purchase of products, a production management system for managing the production process of products, an inventory management system for managing inventory, and a sales management system for managing sales activities. Alternatively, the management system 1 may be configured to share data with and operate in conjunction with the existing systems mentioned above.

As illustrated in FIG. 1, the management system 1 of the present embodiment includes a computer 2, an input reception unit 3, an output unit 4, and a display unit 5. The computer 2 may be a general-purpose computer and includes a CPU (Central Processing Unit) 20, a ROM (Read Only Memory) 21, an I/O interface 22, a RAM (Random Access Memory) 23, and a non-volatile and rewritable storage device 24. These elements are connected to each other via bus lines and can communicate with one another. The computer 2 becomes an element constituting the management system 1 by installing a management program 10 (hereinafter simply referred to as "program 10") from a computer-readable storage medium 11 such as a CD-ROM or a USB memory, or via a network such as the Internet.

The CPU 20 operates virtually as a first calculation unit 200, a second calculation unit 201, a credit management unit 202, a label generation unit 203, and an input processing unit 204 when reading and executing the program 10. The operation of each of the units 200-204 will be described below. The program 10 may be entirely stored in the ROM 21, or at least a portion of the program 10 may be stored in the storage device 24. The RAM 23 and the storage device 24 are used for operations of the CPU 20 as appropriate.

The storage device (storage unit) 24 may include a memory such as a hard disk drive or a solid state drive. The storage device 24 stores, for example, a material information database (DB) 240, a production information database (DB) 241, an inventory information database (DB) 242, a product information database (DB) 243, and a credit balance 244, described below.

The I/O interface 22 functions as a communication interface for performing wired or wireless data communication with the input reception unit 3, the output unit 4, the display unit 5, and other computers.

The input reception unit 3 may include a mouse, a keyboard, a touch panel, etc., and receives operations and data input from a user to the computer 2. The data received by the input reception unit 3 is processed by the input processing unit 204 as appropriate. The user mentioned herein may be, for example, an employee of a business that produces and sells plastic products with a reduced environmental load in accordance with the mass balance method.

The output unit 4 is a printer that prints data held by the computer 2, and the type is not particularly limited. The medium on which printing is performed is not particularly limited, and may be paper, a plastic film, a hard plastic card, or the like. The output unit 4 may be omitted in the management system 1.

The display unit 5 may include, for example, a liquid crystal display, an organic EL display, or a plasma display, and displays information, etc., managed by the management system 1 to the user. When the display unit 5 is configured as a touch panel display, it may also serve as the input reception unit 3.

The management system 1 may include the computer 2 as a host and one or a plurality of computers 2a communicatively connected to the computer 2 as clients. The computer 2a is, for example, a general-purpose personal computer. In this case, each of the computers 2a is configured to be able to access the computer 2 via a communication network, cause the CPU 20 to perform processing, and read out the information stored in the RAM 23 and the storage device 24. In this case, the processing to be described below may be performed by either the computer 2 or the computer 2a, or may be performed by sharing the processing among these computers. At least some of the material information DB 240, the production information DB 241, the inventory information DB 242, and the product information DB 243 may be stored in a storage device (storage unit) external to the computer 2.

<2. Contents of Each Database>

The following is a sequential description of the contents of the material information DB 240, the production information DB 241, the inventory information DB 242, and the product information DB 243, which are used as appropriate for credit management in the management system 1.

[Material Information DB]

In the present embodiment, plastic materials are mainly pellets of thermoplastic resin, and are purchased by units of mass. For plastic materials certified as environmentally friendly, the degree of reduction in environmental load is indicated by a specific parameter. This parameter is hereinafter referred to as the "reduction parameter".

In the management system 1, one type of plastic material is identified by material information. The material information is the information in which the information identifying the plastic material and the reduction parameter are at least associated with each other, and in the present embodiment, is the information in which a product number, a reduction parameter, and a specific gravity are associated with one another. The material information of each plastic material is listed in a table, for example, as illustrated in FIG. 2, and is stored in advance in the storage device 24 as the material information DB 240.

The material information DB 240 can be rewritten as appropriate according to user operations, and it is possible to add information on new types of plastic materials, and modify or delete existing material information.

[Production Information DB]

In the present embodiment, plastic products are mainly plastic films. In the present embodiment, plastic films that have the same product number and mass ratio of plastic material used as a raw material and have the same layer structure and production method are identified by film names. Furthermore, the specific gravity of the plastic films is calculated in advance by multiplying mass ratio by specific gravity for each plastic material used as the raw material and adding the results together. One or a plurality of dimensional standards (thickness, width, length) are also predetermined for each plastic film to which has been assigned a film name. A dimensional standard number is assigned to one or each of a plurality of dimensional standards. The thickness, width and length of the plastic film are identified by referring to the dimensional standard number.

These pieces of information are associated with one another as plastic film production information and organized as data 2410, for example, illustrated in FIG. 3. The data 2410 for each film name is collectively stored in advance in the storage device 24 as the production information DB 241.

The production information DB 241 can be rewritten as appropriate according to user operations, and it is possible to add information on plastic films with new film names and new dimensional standards, and modify or delete existing production information.

[Inventory Information DB]

Inventory information is information for managing plastic films that have already been produced. The inventory information is data 2420 in a tabular format, for example, as illustrated in FIG. 4, and is information in which a film name, a dimensional standard number, and a piece of identification information that identifies a predetermined unit to which a plastic film belongs are at least associated with one another. The identification information includes, for example, information that identifies the production lot of the plastic film. The film name and dimensional standard number are common to the production information DB 241, and thus, it is possible to refer back from product information to production information and eventually to material information.

A plastic film is usually produced in the form of a roll that is wound around a core material and covered with a protective sheet on the surface, and managed as inventory. Inventory information is further associated with the quantity of rolls (inventory quantity) for each dimensional standard number. The inventory quantity is updated as appropriate according to the production and transfer of the relevant plastic film and stored in the storage device 24. In this way, the data 2420 for each film name and each dimensional standard number is accumulated and stored in the storage device 24 as the inventory information DB 242.

[Product Information DB]

On the management system 1, the user can assign reduction parameters to the plastic films managed in the production information DB 241 or the inventory information DB 242. In other words, it is possible to select different reduction parameters and quantities of plastic films to which the reduction parameters are to be assigned for plastic films with the same film name and dimensional standard number. As described below, when reduction parameters are assigned to a specific quantity of plastic films based on production information or inventory information, product information in which the identification information, reduction parameters, and the thickness, width, length, and specific gravity of the plastic films are associated with one another, is generated and stored in the storage device 24. Such product information is accumulated and constitutes the product information DB 243. This makes it possible to easily manage plastic films with certified reduced environmental load and normal plastic films without excessively increasing the management burden associated with the introduction of the mass balance method.

<3. Reduction Parameter>

The reduction parameter is not particularly limited as long as the reduction parameter represents the degree of reduction of the environmental load which is provided by the plastic material and product. In the present embodiment, the reduction parameter is the biomass degree (%). The biomass degree is the mass ratio of bioresources in the raw materials used in the plastic material or product, and the higher the degree, the greater the reduction of the environmental load. The presence or absence of bioresources in the raw materials can be confirmed by checking whether there is about 105.5 pMC of radiocarbon (C14) in the total carbon atoms contained in the raw materials. The presence or absence of radiocarbon (C14) can be measured using an accelerator mass spectrometer based on ISO16620-2:2015.

In the management system 1, the concept of "credit" is introduced to quantify the reduction amount of environmental load. The credit is treated as something increasing with the increase in the mass of bioresources contained in the purchased material and decreasing with the mass of the bioresources consumed. Therefore, as described below, the credit increase amount is calculated when the material is purchased, and the credit decrease amount is calculated when the product is produced or transferred. Furthermore, in the management system 1, the credit balance is updated in real time based on the credit increase amount and credit decrease amount.

<4. Operation of Management System>

[Operation in Response to Purchase]

Figure 5:
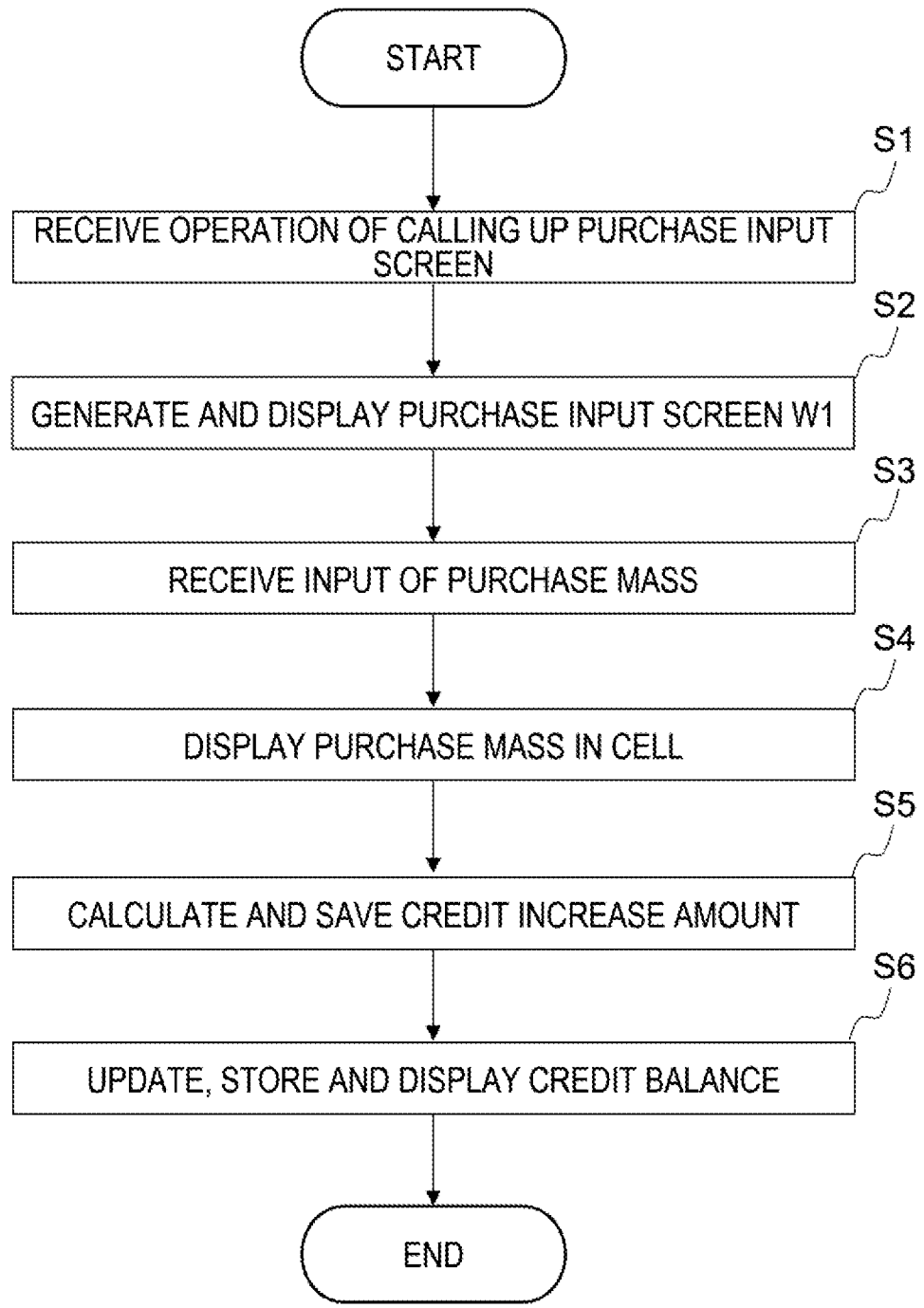
FIG. 5 is a flowchart illustrating an operation flow of the management system according to purchase.

FIG. 5 is a flowchart illustrating an operation flow of the management system 1 according to purchase over a certain period of time. The certain period of time is a period of time defined for convenience in the management system 1, and the user can set the start and end of the period as appropriate. A common period is also set for production and transfer. The following describes the operation of the management system 1 according to purchase with reference to the drawings.

In the present embodiment, it is assumed that each type of plastic material is purchased by units of mass. The user performs an operation to call up the purchase input screen for inputting the purchase mass of each type of plastic material via the input reception unit 3 in accordance with the purchase of plastic materials. This allows the input reception unit 3 to receive operations from the user (step S1).

Figure 6:
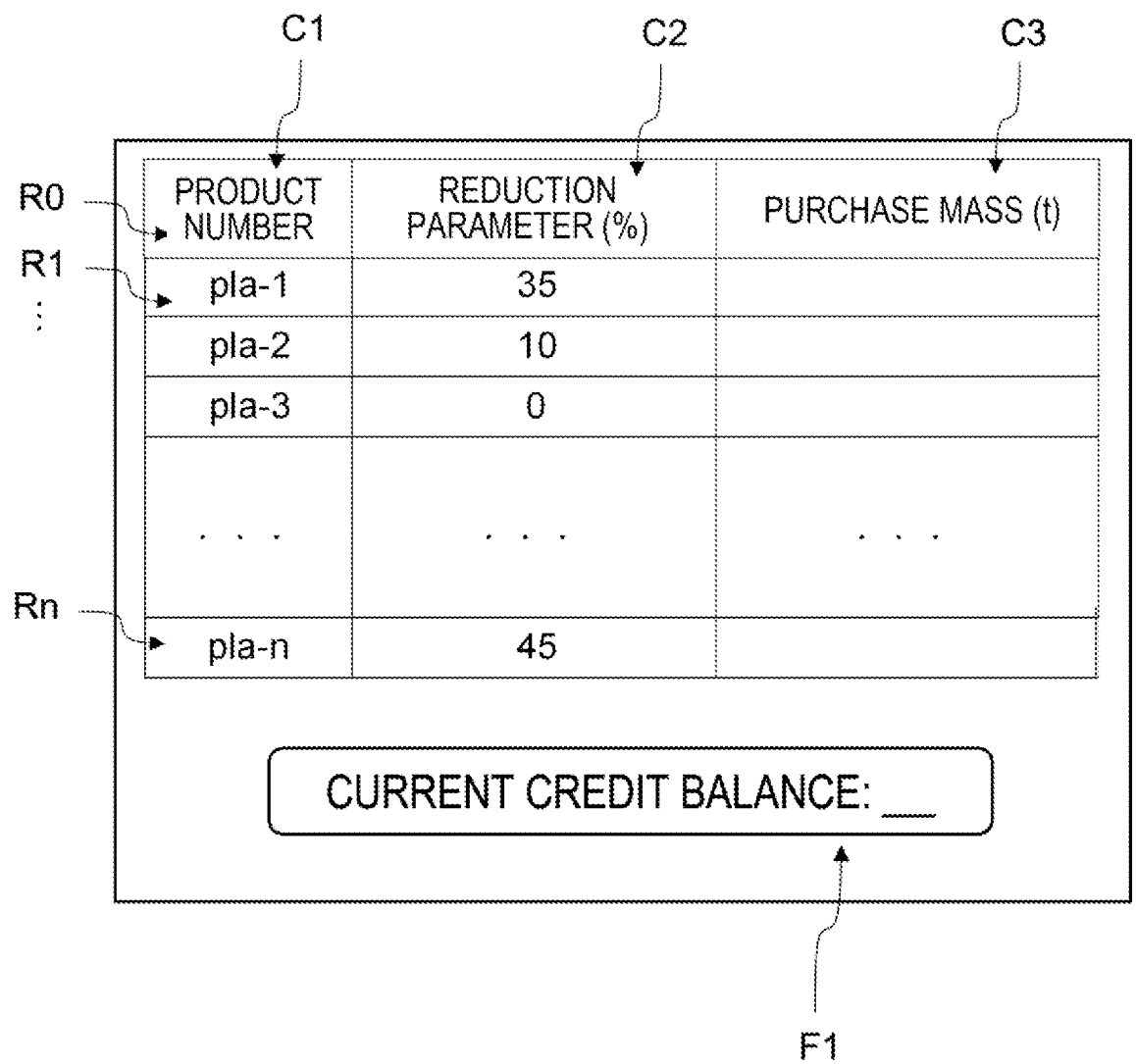
FIG. 6 is a diagram illustrating an example of a purchase input screen.

The input processing unit 204 then generates a purchase input screen W1 (see FIG. 6) and displays it on the display unit 5 (step S2). The purchase input screen W1 includes, for example, a table consisting of rows R0, R1, . . . , Rn and columns C1, C2, C3, and field F1 displaying the current credit balance. Row R0 displays headings such as "product number", "reduction parameter (%)" and "purchase mass (t)". On the other hand, columns C1 and C2 in row R1 and below display data corresponding to the headings in row R0, respectively. That is, column C1 displays "pla-1", etc., which represent the product numbers, and column C2 displays the reduction parameter "35", etc., which correspond to the product numbers in column C1 of the same row, respectively. These data are displayed by referring to the material information DB 240.

At this point, column C3 in row R1 and below has blank cells. After selecting one cell via the input reception unit 3, the user inputs the purchase mass of the plastic material of the product number corresponding to the selected cell via the input reception unit 3. This allows the input reception unit 3 to receive the input of the purchase mass from the user (step S3).

The input processing unit 204 displays the purchase mass in the cell of the purchase input screen W1 in response to the input received in step S3 (step S4).

The first calculation unit 200 calculates the credit increase amount in parallel with or before or after step S4 and stores the amount in the RAM 23 or the storage device 24 (step S5). The credit increase amount can be calculated as the sum of the product of "reduction parameter/100" and "purchase mass" of each column. That is, the credit increase amount in the present embodiment is the total amount of bioresources that is substantively acquired through the purchase of plastic materials. The credit increase amount quantifies the increase in the amount of possible reduction in environmental load due to purchase.

The credit management unit 202 adds the credit increase amount calculated in step S5 to the credit balance 244 stored in the storage device 24, and stores the credit balance after the addition in the storage device 24 (step S6). In this manner, the credit management unit 202 updates the credit balance 244 based on the credit increase amount each time the credit increase amount is calculated. The credit balance 244 stored in the storage device 24 at the beginning of the certain period of time can be treated as the initial balance carried over from the previous period. Accordingly, the credit management unit 202 updates the credit balance 244 based on the initial balance and the credit increase amount.

Furthermore, in step S6, the credit management unit 202 displays the updated credit balance 244 as the current credit balance in field F1. This allows the user to check the credit held in real time and facilitates the planning of production and sales for the current period.

The above steps S1-S6 may be executed each time when the actual plastic material is acquired, or each time when the acquisition of plastic material becomes definite.

[Operation According to Production]

Figure 7:
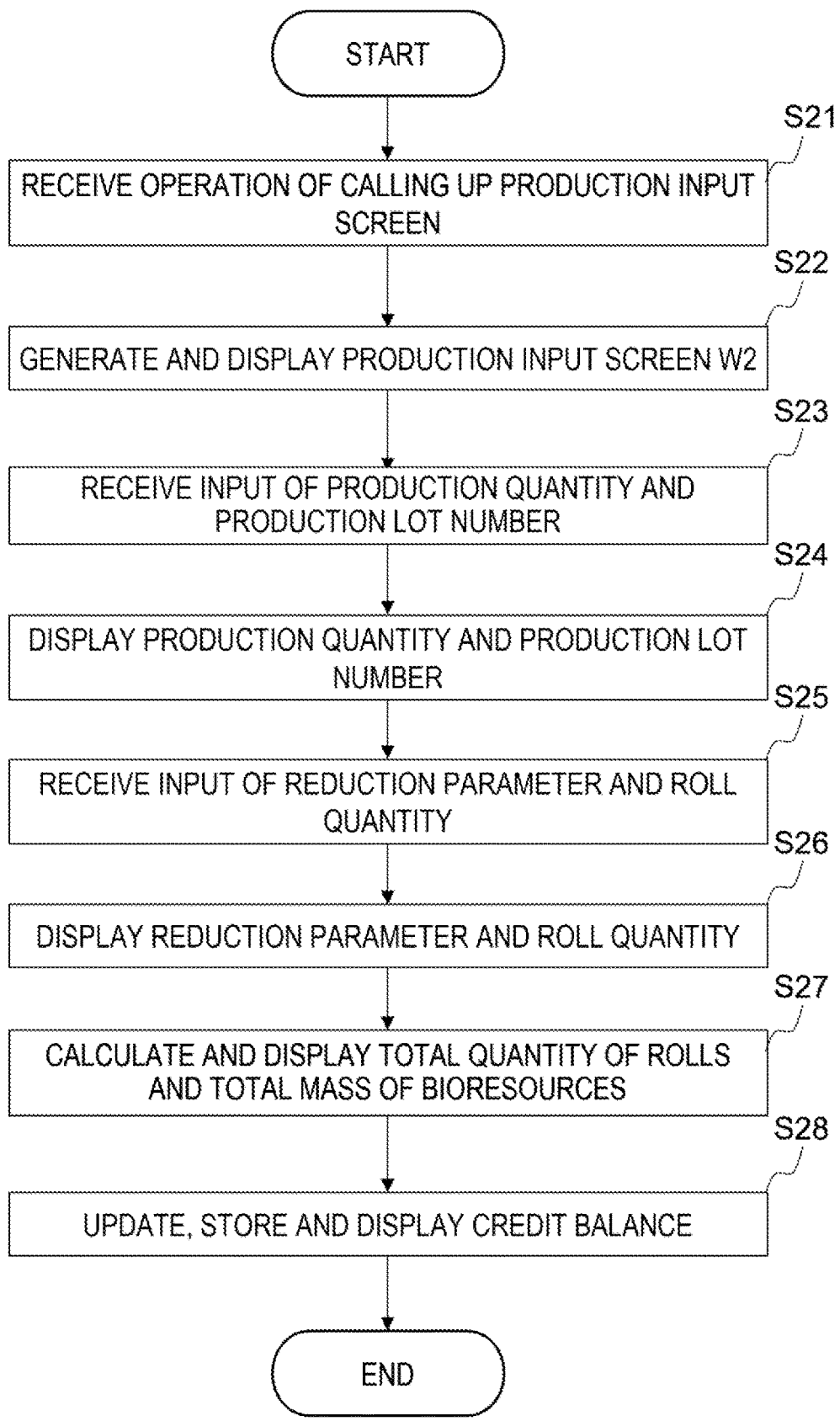
FIG. 7 is a flowchart illustrating an operation flow of the management system according to production.

FIG. 7 is a flowchart illustrating an operation flow of the management system 1 according to production of plastic films over a certain period of time. This operation is performed when the consumption of bioresources is linked to the production of a product. In a single production lot, a plurality of rolls of substantively identical plastic films, which are identified by the same film name and dimensional standard number, are usually produced.

The following explains an example of producing one production lot of plastic film with a film name "pf-1" and a dimensional standard number 1. The plastic film "pf-1" contains 30% by mass of the plastic material "pla-3" with a reduction parameter of 0% and 70% by mass of the plastic material "pla-1" with a reduction parameter of 35%, for example. In this case, the specific gravity of the plastic film "pf-1" calculated based on the material information DB is 1.025 (=1.2.0.3+0.95.0.7). This specific gravity is stored in advance in the production information DB 241.

The user performs an operation via the input reception unit 3 to call up a production input screen for inputting the data about the plastic film "pf-1" to be produced. This operation may include, for example, selecting or inputting the film name and dimensional standard number of the plastic film "pf-1". This allows the input reception unit 3 to receive operations from the user (step S21).

The input processing unit 204 then generates the production input screen W2 and displays it on the display unit 5 (step S22). A production input screen W2 includes field F2 for the film name and production lot number selected or input in step S21, table T1, table T2, and field F3 for the current credit balance as illustrated in FIG. 8A, for example. At this time, the production lot number is not displayed in field F2. In addition, field F3 displays the credit balance 244 currently stored in the storage device 24.

Table T1 displays the dimensions, specific gravity, mass per roll and production quantity of rolls of the plastic film "pf-1". The cells under the headings "thickness (μm)", "width (mm)", "length (m)" and "specific gravity" display data of the thickness, width, length, and specific gravity of the plastic film "pf-1", respectively. These data are displayed by referring to the production information DB 241 based on the film name and dimensional standard number input in step S21, for example. In the cell under the heading "mass (t)", the mass (="thickness"·"width"·"length"·"specific gravity") automatically calculated from the data of thickness, width, length and specific gravity is displayed. This mass indicates the mass per roll.

Table T2 displays the values of the reduction parameters to be assigned, the quantity of rolls, and the mass of bioresources converted from these values. At the time point of step S22, the cells under the headings "reduction parameter (%)", "quantity (rolls)" and "mass (t)" in table T2 are blank. In addition, a cell is provided in the last row of table T2 to represent the total quantity of rolls and the total mass of bioresources.

The user selects a blank cell under the heading "production quantity (rolls)" and inputs the quantity of rolls to be produced in the production lot and inputs the production lot number in field F2 via the input reception unit 3. This allows the input reception unit 3 to receive the production quantity of rolls and the production lot number input from the user (step S23).

The input processing unit 204 displays the production lot number in field F2 and the production quantity in the selected cell according to the inputs received in step S23, respectively (step S24). For example, when a production lot number "12345" and a production quantity "100" are input in step S23, the production lot number "12345" is displayed in field F2 and "100" is displayed in the selected cell, respectively (see FIG. 8B).

The user then selects the blank cells under the headings "reduction parameter (%)" and "quantity (rolls)" in table T2 and inputs the reduction parameter (%) to be assigned to each cell and the quantity of rolls via the input reception unit 3. This allows the input reception unit 3 to receive the reduction parameter (%) and the quantity of rolls input from the user (step S25). The number of rows in table T2 may be increased or decreased in accordance with the number of reduction parameters to be as signed.

The input processing unit 204 sequentially displays numerical values representing the reduction parameter and the quantity of rolls in the selected cells according to the inputs received in step S25 (step S26). For example, for 100 rolls of the plastic film "pf-1", when a reduction parameter 0% is assigned to 30 rolls, 15% to another 30 rolls, and 50% to the remaining 40 rolls, respectively, the production input screen W2 is as illustrated in FIG. 8B.

Referring again to FIG. 7, the second calculation unit 201 calculates each of the mass of bioresources for each reduction parameter and the total quantity of rolls and the total mass of bioresources, and displays these values in the respective cells (step S27). The mass of bioresources for each reduction parameter is calculated by "reduction parameter/100"·"quantity"·"mass per roll" and is displayed in the cell under the heading "mass (t)" in table T2. The total quantity of rolls and the total mass of bioresources are displayed in the bottom cells, respectively. The second calculation unit 201 stores the total mass of bioresources as a credit decrease amount in the RAM 23 or the storage device 24. The credit decrease amount can be said to be the reduction amount of the environmental load that should be certified as having been achieved.

The user can determine the combination of reduction parameter and quantity of rolls to the extent that the credit decrease amount calculated in step S27 does not exceed the credit balance 244. Therefore, the second calculation unit 201 may display a warning to the user on the display unit 5 when the credit decrease amount calculated from the reduction parameter and the quantity of rolls whose inputs are received in step S25 exceeds the credit balance 244.

The credit management unit 202 subtracts the credit decrease amount calculated in step S27 from the credit balance 244 stored in the storage device 24, and stores the credit balance after the subtraction in the storage device 24 (step S28). In this manner, the credit management unit 202 updates the credit balance 244 based on the credit decrease amount each time the credit decrease amount is calculated. Thus, the credit management unit 202 updates the credit balance 244 based on the credit decrease amount in addition to the initial balance and credit increase amount.

The credit management unit 202 further displays the updated credit balance 244 as the current credit balance in field F3 of the production input screen W2 in step S28.

The production information referred to in step S22, the production lot number received in step S23, and the reduction parameter and roll quantity received in step S25 are associated with each other and stored in the storage device 24 as product information.

[Operation According to Transfer]

FIG. 9 is a flowchart illustrating an operation flow of the management system 1 according to transfer of plastic films. This operation is performed when the consumption of bioresources is linked to the transfer of a product. Thus, the operation illustrated in FIG. 9 is basically performed instead of the operation illustrated in FIG. 7. The following explains an example of transferring 50 rolls of plastic film with the film name "pf-1" and the production lot number "12345".

The user performs an operation via the input reception unit 3 to call up a transfer input screen for inputting the data about the plastic film "pf-1" to be transferred. This operation may include, for example, selecting or inputting the film name and the production lot number "12345" of the plastic film "pf-1". This allows the input reception unit 3 to receive operations from the user (step S31).

Figure 10A:
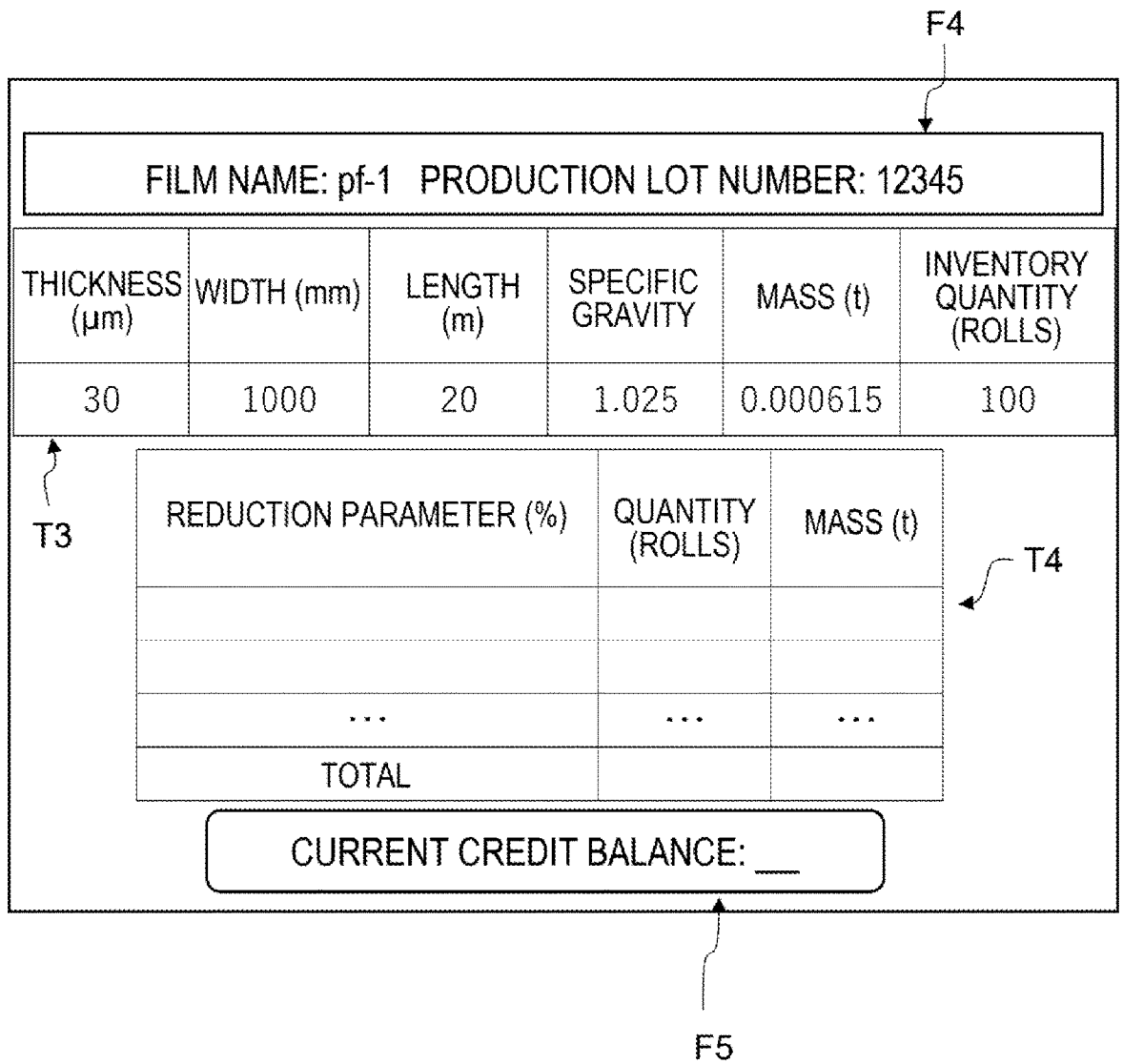
FIG. 10A is a diagram illustrating an example of a transfer input screen.

The input processing unit 204 then generates a transfer input screen W3 and displays it on the display unit 5 (step S32). The transfer input screen W3 includes field F4 for the film name and production lot number selected or input in step S31, table T3, table T4, and field F5 for the current credit balance as illustrated in FIG. 10A, for example. Field F4 displays the film name "pf-1" and the production lot number "12345". Field F5 displays the credit balance 244 currently stored in the storage device 24.

Table T3 represents the same data as table T1 in the production input screen W2, and these data are displayed by referring to the inventory information DB 242 based on, for example, the film name input in step S31. In table T3, instead of the heading "production quantity (rolls)" in table T1, the heading "inventory quantity (rolls)" is displayed, and the lower cell displays the quantity of rolls currently remaining as inventory. In addition, the cell under the heading "mass (t)" displays the mass per roll (="thickness"·"width"·"length"·"specific gravity"), as in table T1.

Table T4 displays the values of the reduction parameters assigned to the rolls to be transferred, the quantity of the rolls to be transferred, and the mass of bioresources converted from these values. At the time point of step S32, the cells under the headings "reduction parameter (%)", "quantity (rolls)" and "mass (t)" in table T4 are blank. In addition, a cell is provided in the last row of table T4 to represent the total quantity of rolls and the total mass of bioresources.

The user selects the blank cells under the headings "reduction parameter (%)" and "quantity (rolls)" in table T4 and inputs the reduction parameter (%) to be assigned and the quantity of rolls to be transferred to each cell via the input reception unit 3. This allows the input reception unit 3 to receive the user's inputs of the reduction parameter (%) and the quantity of rolls to be transferred (step S33). The quantity of rows in table T2 may be increased or decreased in accordance with the number of reduction parameters to be assigned.

The input processing unit 204 displays numerical values representing the reduction parameter and the quantity of rolls in the cells according to the inputs received in step S33 (step S34). For example, for 50 rolls of the plastic film "pf-1" to be transferred, when a reduction parameter 0% is assigned to 5 rolls, 15% to 15 rolls, and 50% to the remaining 30 rolls, respectively, the transfer input screen W3 is as illustrated in FIG. 10B.

Referring again to FIG. 9, the second calculation unit 201 calculates each of the mass of bioresources for each reduction parameter and the total quantity of rolls and the total mass of bioresources, and displays these values in each respective cell (step S35). The mass of bioresources for each reduction parameter is calculated by "reduction parameter/100"·"quantity"·"mass" and is displayed in the cell under the heading "mass (t)" in table T4. The total quantity of rolls and the total mass of bioresources are displayed in the bottom cells, respectively. The second calculation unit 201 stores the total mass of bioresources as a credit decrease amount in the RAM 23 or the storage device 24. The credit decrease amount can be said to be the reduction amount of the environmental load that should be certified as having been achieved.

The user can determine the combination of reduction parameter and quantity of rolls to the extent that the credit decrease amount calculated in step S35 does not exceed the credit balance 244. Therefore, the second calculation unit 201 may display a warning to the user on the display unit 5 when the credit decrease amount calculated from the reduction parameter and the quantity of rolls of which input is received in step S33 exceeds the credit balance 244.

The credit management unit 202 subtracts the credit decrease amount calculated in step S35 from the credit balance 244 stored in the storage device 24, and stores the credit balance after the subtraction in the storage device 24 (step S36). In this manner, the credit management unit 202 updates the credit balance 244 based on the credit decrease amount each time the credit decrease amount is calculated.

The credit management unit 202 further displays the updated credit balance 244 as the current credit balance in field F5 of the transfer input screen W3 in step S36. The credit management unit 202 may also update the inventory information by subtracting the quantity of rolls to be transferred from the inventory quantity of the inventory information referred in step S32 and storing the inventory quantity after subtraction in the storage device 24.

The inventory information referred to in step S32 and the reduction parameter and roll quantity received in step S33 are associated with each other and stored in the storage device 24 as product information.

The above steps S31-S36 may be performed at any timing related to the transfer of plastic film, such as at the time of concluding a sales contract, at the time of sale, or at the time of shipment, for example.

[Label Output Operation]

Figure 11:
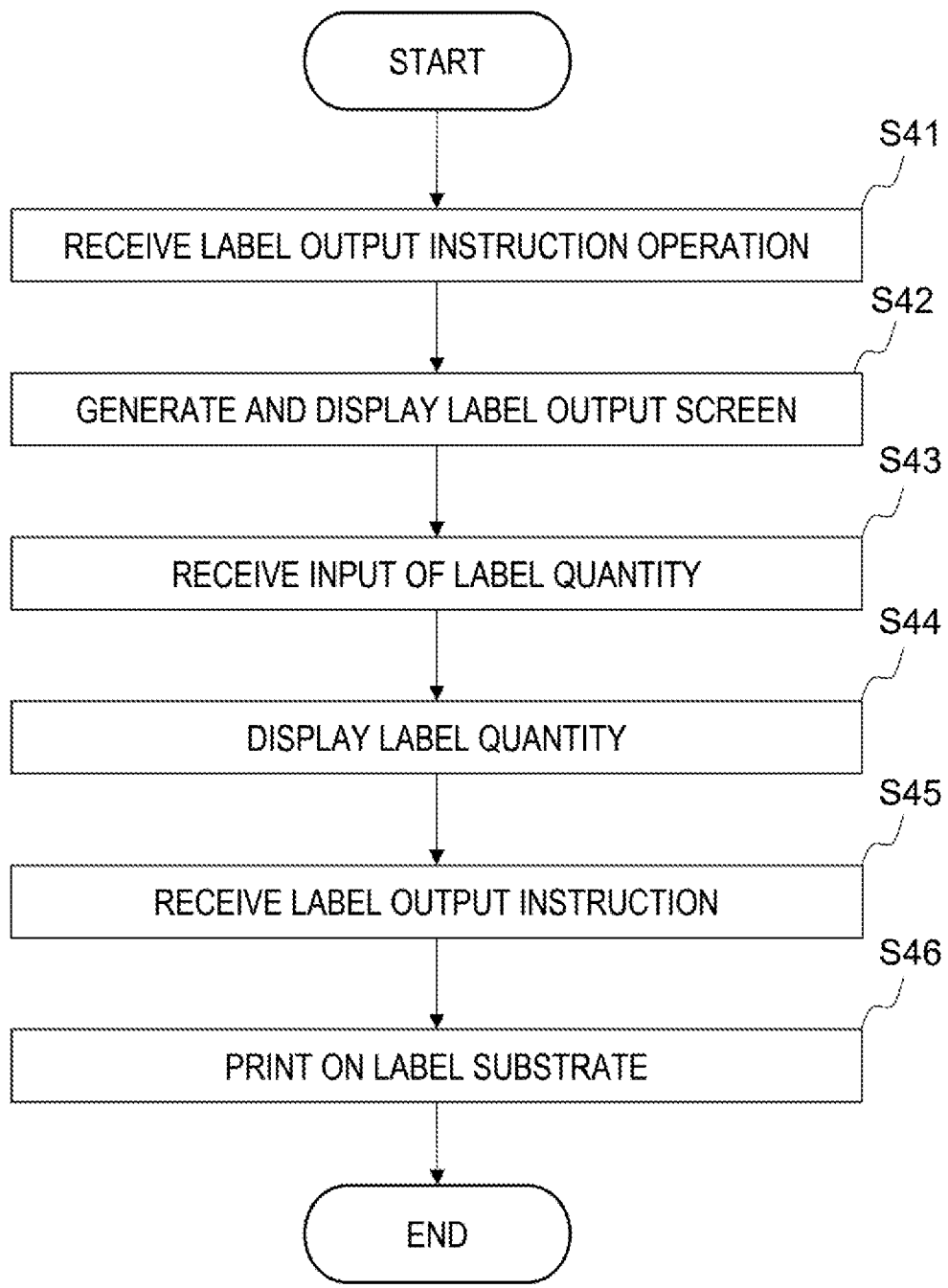
FIG. 11 is a flowchart illustrating a label output operation flow of the management system.

In addition to the credit management function described above, the management system 1 according to the present embodiment further has a label output function for facilitating the management of plastic film as a product. The labels herein are physical labels that display the product information of plastic film, for example, seal labels that can be attached to rolls of plastic film. FIG. 11 is a flowchart illustrating a label output operation flow of the management system 1. The following is an explanation.

When the user operates the input reception unit 3 to instruct a label output, the input reception unit 3 receives an operation from the user who instructs the label output (step S41). This operation includes selecting or inputting the film name, production lot number and dimensional standard number of a specific plastic film.

The label generation unit 203 searches the product information DB 243 based on the film name, production lot number and dimensional standard number selected or input in step S41, and reads the corresponding product information. The label generation unit 203 generates a label output screen W4 for outputting the read out product information on a label (step S42).

Figure 12A:
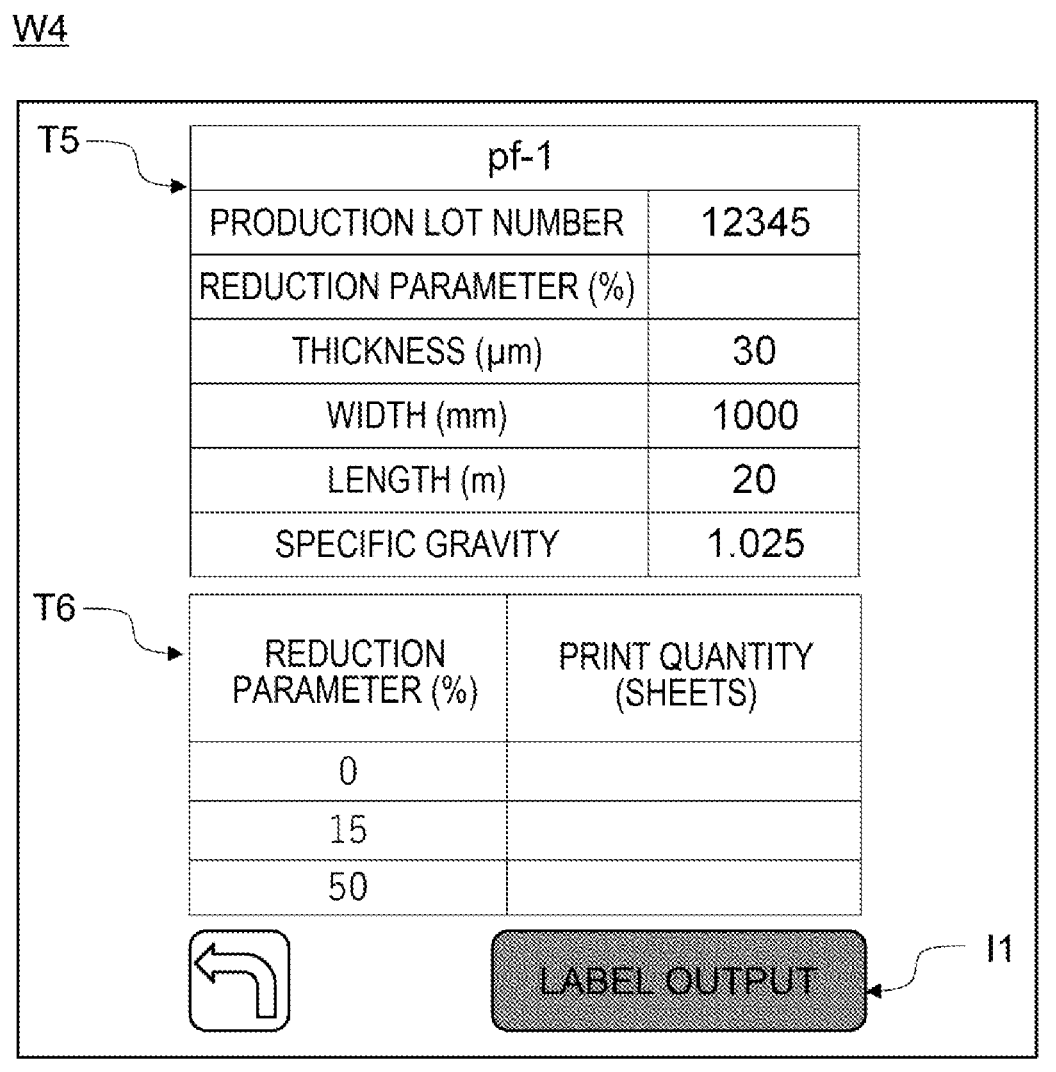

The label output screen W4 includes table T5, table T6, and an output button image I1 as illustrated in FIG. 12A, for example. Table T5 displays the film name, production lot number, dimensions and specific gravity included in the read out product information. Here, next to the heading "reduction parameter (%)" in Table T5 is a blank cell. Table T6 displays the reduction parameters included in the read out product information and the print quantities of labels for them. At the time of step S42, below the heading "print quantity (sheets)" in Table T6 is a blank cell. In addition, the output button image I1 is deactivated.

The user selects a blank cell under the heading "print quantity (sheets)" in table T6 and inputs the quantity of labels that the user wishes to print in accordance with each of the reduction parameters via the input reception unit 3. This allows the input reception unit 3 to receive the user's input of the quantity of labels in accordance with each of the reduction parameters (step S43).

Figure 12B:
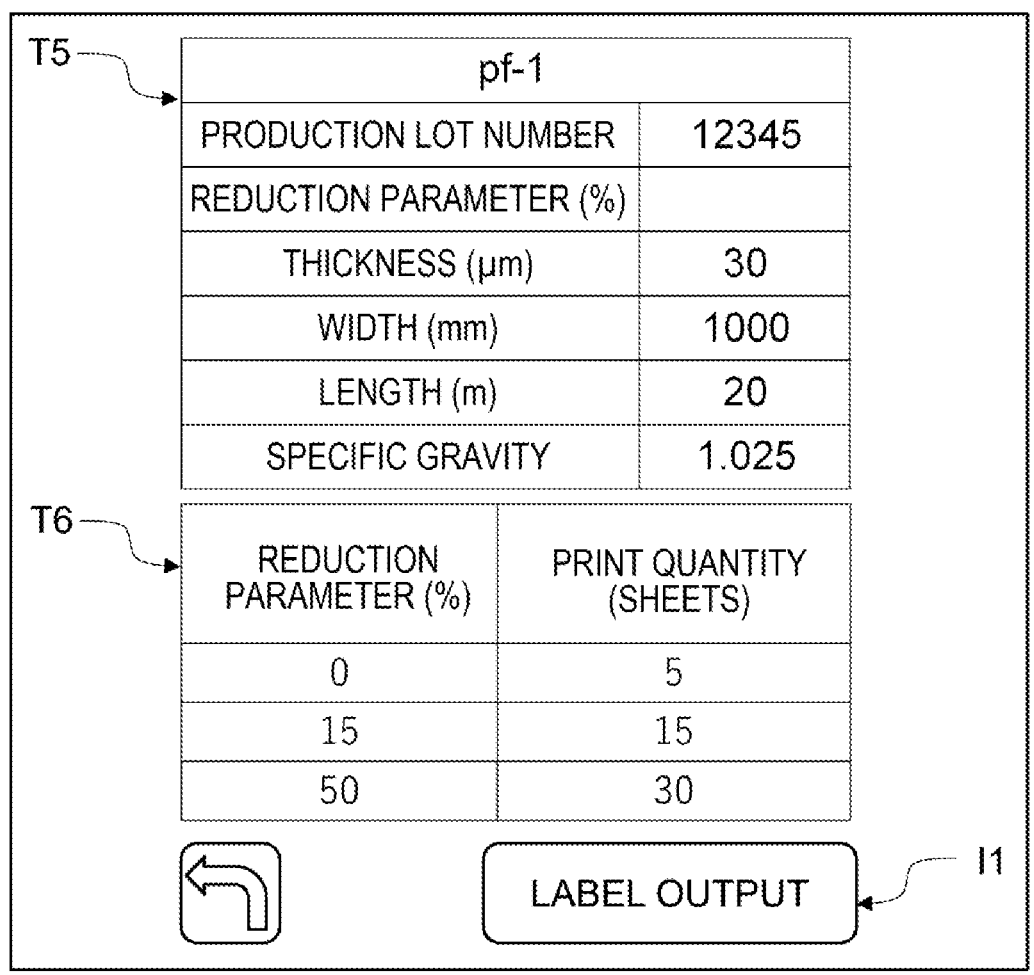
FIG. 12B is a diagram illustrating an example of the label output screen.

According to the inputs received in step S43, the input processing unit 204 sequentially displays numerical values representing the quantities of labels in the selected cells and activates the output button image I1 (step S44). For example, when a print quantity of 5 is input for a reduction parameter 0%, 15 for 15%, and 30 for 50%, respectively, the label output screen W4 is as illustrated in FIG. 12B.

When the user then taps the output button image I1 via the input reception unit 3, the input reception unit 3 receives the pressing behavior and instructs the label generation unit 203 to output the labels (step S45).

The label generation unit 203 creates table data in which the value of any of the reduction parameters in Table T6 is substituted into a blank cell in Table T5, and causes the output unit 4 to print the table data on label substrates for the print quantities corresponding to the reduction parameters (step S46). The label generation unit 203 performs the same operation for all the reduction parameters. Thus, a table with blank cells in Table T5 filled with "0" is printed on 5 label substrates, a table with blank cells in Table T5 filled with "15" is printed on 15 label substrates, and a table with blank cells in Table T5 filled with "50" is printed on 30 label substrates, respectively. This produces a physical label that displays the product information associated with the production lot, reduction parameters, thickness, width, length and specific gravity of the plastic film.

The above label can be attached, for example, to a protective sheet covering the roll of plastic film. This facilitates management of the physical inventory in conjunction with the management system 1 and ensures traceability. The product information may be coded by the label generation unit 203 and printed on the label substrate in the form of an optically readable one-dimensional code or two-dimensional code, instead of being printed on the label substrate in the form of, for example, letters and numbers.

<5. Features>

The management system 1 may be integrated or linked with an existing management system such as a procurement management system, a production management system for managing the production process of products, an inventory management system for managing inventory, and a sales management system for managing sales activities. This makes it possible to easily introduce the mass balance method, thereby promoting the production and sales of environmental value-added products. In addition, the management system 1 updates the credit balance in real time. This makes it possible to flexibly assign reduction parameters to products while following the mass balance method.

When the plastic product is a plastic film, the credit decrease amount is calculated in the management system 1 using conventionally used values (standard values of thickness, width, length, and specific gravity, or values monitored on the production line). Therefore, the work of actually measuring the mass of each roll of plastic film produced and managing the records may be omitted, ensuring easy management of the credit. The above management method is also superior in that the credit decrease amount can be calculated without considering the mass of sub-materials such as the core material and protective sheet that accompany the roll of plastic film.

<6. Modifications>

Several embodiments of the present disclosure have been described above, but the present disclosure is not limited to the above embodiments, and various modifications may be made as long as they do not depart from the intent of the disclosure. For example, the following modifications are possible. In addition, the points of the following modifications may be combined as appropriate.

<6-1>

The reduction parameter is not limited to the biomass degree. The reduction parameter may be, for example, the content of recycled raw materials, the content of biodegradable materials, or the substantive greenhouse gas emission reduction amount related to the production of the plastic material. Recycled raw materials are obtained by recycling plastic intermediates or products one or more times. Biodegradable materials are typically biodegradable plastics, which are materials that are completely consumed by the action of microorganisms and ultimately produce only natural by-products such as carbon dioxide, water, and methane. The substantive greenhouse gas emission reduction amount is, for example, the emission amount of greenhouse gases (carbon dioxide, methane, dinitrogen monoxide, fluorocarbons, etc.) reduced by, for example, the use of clean energy in production, or the emission amount of greenhouse gases certified as reduced on a carbon-neutral basis.

<6-2>

Material information, production information, inventory information and product information are not limited to the forms described in the above embodiments, and may be changed as appropriate. For example, at least two of the material information, production information, inventory information and product information may be integrated. The configurations of the purchase input screen W1, the production input screen W2, the transfer input screen W3, and the label output screen W4 are also not limited to the configurations described in the above embodiment, and may be changed as appropriate. For example, a single screen in which the information displayed on the screens W1 to W4 is collectively displayed may be generated, or a screen in which the information to be displayed can be switched in a tab format may be generated.

<6-3>

In steps S21-S28 and steps S31-S36 of the above embodiment, reduction parameters are assigned on a roll-by-roll basis. The credit decrease amount is then calculated based on the mass per roll, each reduction parameter, and the roll quantity specified for each reduction parameter. However, the assignment of reduction parameters may also be performed by specifying the length of the plastic film in accordance with each reduction parameter. In this case, the credit decrease amount may be calculated based on each reduction parameter and the length, thickness, width, and specific gravity specified for each reduction parameter.

<6-4>

The description of the above embodiment has been given of a case in which different reduction parameters are assigned among products belonging to the same production lot, but the management system 1 may also be applied to a case in which different reduction parameters are assigned among products belonging to different production lots.

<6-5>

The assignment of reduction parameters may be changed as appropriate within the range of the credit balance after the assignment has been performed once. In the above embodiment, the assignment of reduction parameters is performed in accordance with the production or transfer of products, but the management system 1 may also be configured so that the assignment is performed in both cases. For example, the management system 1 may be configured so that a reduction parameter can also be changed at the time of transferring a product when the reduction parameter has been assigned at the time of producing the product. The credit balance 244 and the product information DB 243, etc. may be rewritten as appropriate in accordance with the change in the assignment of reduction parameters.

<6-6>

Plastic products are not limited to a plastic film.

DESCRIPTION OF REFERENCE SIGNS

1: Management system
2: Computer
3: Input reception unit
4: Output unit
24: Storage device (storage unit)

The invention claimed is:

1. A management system comprising:
a plurality of computers comprising a host computer and client computers communicatively connected to the host computer,
wherein the host computer comprises:
a first calculation unit that calculates, according to a purchase of one or a plurality of types of plastic material during a predetermined period of time, an increase amount of credit that quantifies a reduction amount in an environmental load based on a purchase mass of each of the types of the plastic material and a parameter that represents a mass ratio of bioresources, recycled raw materials, or biodegradable materials in raw materials for each of the types of the plastic material;
a second calculation unit that calculates a decrease amount of the credit according to production of plastic films respectively containing the one or the plurality of types of plastic materials as a raw material during the predetermined period of time;
a storage unit that stores an initial balance of the credit at a beginning of the predetermined period of time;
a credit management unit that updates a balance of the credit based on the initial balance, the increase amount, and the decrease amount; and
an input processing unit that is configured to process an input of the parameter as a percentage to be assigned respectively to each quantity of the plastic films to be produced from a user and generate a production input screen that displays the parameter as the percentage and a mass of bioresources, recycled raw materials, or biodegradable materials assigned to each quantity of the plastic films to be produced in association with each other,
wherein the second calculation unit is configured to calculate the decrease amount based on a mass of the bioresources, recycled raw materials, or biodegradable materials in the raw materials of each of the plastic films to be produced during the predetermined period of time and the parameters the parameter as the percentage assigned respectively to each quantity of the plastic films to be produced,
wherein the client computers are each coupled with a display unit configured to display the production input screen, and
wherein the host computer causes the display unit of at least one of the client computers to display a warning to the user when the decrease amount calculated exceeds the balance of the credit so as to reduce the environmental load of the plastic films.

2. The management system according to claim 1,
wherein the second calculation unit further calculates the mass of each of the plastic films to be produced based at least on a thickness, a width, a length, and a specific gravity of each of the plastic films.

3. The management system according to claim 1, wherein the second calculation unit calculates the decrease amount based at least on a thickness, a width, a length, and a specific gravityof one of the plastic films to which the parameter is assigned.

4. The management system according to claim 1,
wherein the storage unit further stores product information in which identification information identifying a predetermined unit to which each of the plastic films belongs, the parameter as the percentage assigned to each of the plastic films, and a thickness, a width, and a length of each of the plastic films are associated with one another.

5. The management system according to claim 4, further comprising:
an output unit that outputs the product information to a physical label.

6. A management method executed by a plurality of computers comprising a host computer and client computers communicatively connected to the host computer, wherein the client computers are each coupled with a display unit, the management method comprising:

calculating, by the host computer, according to a purchase of one or a plurality of types of plastic material during a predetermined period of time, an increase amount of credit that quantifies a reduction amount in an environmental load based on a purchase mass of each of the types of the plastic material and a parameter that represents a mass ratio of bioresources, recycled raw materials, or biodegradable materials in raw materials for each of the types of the plastic material;

calculating, by the host computer, a decrease amount of the credit according to a production of plastic films respectively containing the one or the plurality of types of plastic material as a raw material during the predetermined period of time;

storing, by the host computer, an initial balance of the credit at a beginning of the predetermined period of time in a storage device;

updating, by the host computer, a balance of the credit based on the initial balance, the increase amount, and the decrease amount;

processing, by the host computer, an input of the parameter as a percentage to be assigned respectively to each quantity of the plastic films to be produced from a user;

generating a production input screen that displays the parameter as the percentage and a mass of bioresources, recycled raw materials, or biodegradable materials assigned to each quantity of the plastic films to be produced in association with each other; and displaying the production input screen on at least one of the display units, wherein the calculating the decrease amount of the comprises calculating the decrease amount based on a mass of the bioresources, recycled raw materials, or biodegradable materials in the raw materials of each of the plastic films to be produced during the predetermined period of time and the parameter as the percentage assigned to each quantity of the plastic films to be produced, wherein the host computer causes the display unit of at least one of the client computers to display a warning to the user when the decrease amount calculated exceeds the balance of the credit so as to reduce the environmental load of the plastic films.

7. A management system comprising:
a plurality of computers comprising a host computer and client computers communicatively connected to the host computer,
wherein the host computer comprises:
  a first calculation unit that calculates, according to a purchase of one or a plurality of types of plastic material during a predetermined period of time, an increase amount of credit that quantifies a reduction amount in an environmental load based on a purchase mass of each of the types of the plastic material and a parameter that represents a mass ratio of bioresources, recycled raw materials, or biodegradable materials in raw materials for each of the types of the plastic material;
  a second calculation unit that calculates a decrease amount of the credit according to a transfer of plastic films respectively containing the one or the plurality of types of plastic materials as a raw material during the predetermined period of time;
  a storage unit that stores an initial balance of the credit at a beginning of the predetermined period of time;
  a credit management unit that updates a balance of the credit based on the initial balance, the increase amount, and the decrease amount; and
  an input processing unit that is configured to process an input of the parameter as a percentage to be assigned respectively to a quantity of the plastic films to be transferred from a user and generate a transfer input screen that displays the parameter as the percentage and a mass of bioresources, recycled raw materials, or biodegradable materials for each quantity of the plastic films to be transferred in association with each other, wherein the second calculation unit calculates the decrease amount based on a mass of the bioresources, recycled raw materials, or biodegradable materials in the raw materials of each of the plastic films to be transferred during the predetermined period of time and the parameter as the percentage assigned respectively to each quantity of the plastic films to be transferred, wherein the client computers are each coupled with a display unit configured to display the transfer input screen, and the host computer causes the display unit of at least one of the client computers to display a warning to the user when the decrease amount calculated exceeds the balance of the credit.

8. The management method according to claim 6, further comprising:
processing an input of information of pellets of the one or the plurality of types of plastic that is actually purchased and including at least one type of plastic resin with a reduced environmental load as the one or a plurality of types of plastic material from the user; and
processing an input of information of a plastic film that is actually produced and using the pellets of the one or the plurality of types of plastic, as the product containing the one or the plurality of types of plastic material as a raw material from the user.

9. The management method according to claim 8, further comprising:
generating a physical label that displays a product information in which identification information identifying a predetermined unit to which the plastic film belongs, the parameter as the percentage assigned to the plastic film, and at least one of a thickness, a width, and a length of the plastic film.

10. The management system according to claim 1, wherein the credit management unit displays an updated credit balance on the display unit after the input processing unit processes the input, the credit management unit updating the balance of the credit based on the initial balance, the increase amount, and the decrease amount.

11. The management method according to claim 6, further comprising:
displaying an updated credit balance on the display unit after the processing the input, updating the balance of the credit based on the initial balance, the increase amount, and the decrease amount.

12. A management method executed by a plurality of computers comprising a host computer and client computers communicatively coupled to the host computer, wherein the client computers are each coupled with a display unit, the management method comprising:
calculating, by the host computer, according to a purchase of one or a plurality of types of plastic material during a predetermined period of time, an increase amount of credit that quantifies a reduction amount in an environmental load based on a purchase mass of each of the types of the plastic material and a parameter that represents a mass ratio of bioresources, recycled raw materials, or biodegradable materials in raw materials for each of the types of the plastic material;

calculating, by the host computer, a decrease amount of the credit according to a transfer of plastic films respectively containing the one or the plurality of types of plastic material as a raw material during the predetermined period of time;

storing, by the host computer, an initial balance of the credit at a beginning of the predetermined period of time in a storage device;

updating, by the host computer, a balance of the credit based on the initial balance, the increase amount, and the decrease amount;

processing, by the host computer, an input of the parameter as a percentage to be assigned respectively to each quantity of the plastic films to be transferred from a user;

generating a transfer input screen that displays the parameter as the percentage and a mass of bioresources, recycled raw materials, or biodegradable materials assigned to each quantity of the plastic films to be transferred in association with each other; and displaying the transfer input screen on at least one of the display units, wherein the calculating the decrease amount of the credit comprises calculating the decrease amount based on a mass of the bioresources, recycled raw materials, or biodegradable materials in the raw materials of each of the plastic films to be transferred during the predetermined period of time and the parameter as the percentage assigned respectively to each quantity of the plastic films to be transferred, wherein the host computer causes the display unit of at least one of the client computers to display a warning to the user when the decrease amount calculated exceeds the balance of the credit so as to reduce the environmental load of the plastic films.

13. The management system according to claim 7,
wherein the credit management unit displays the updated credit balance on the display unit after the input processing unit processes the input, the credit management unit updating the balance of the credit based on the initial balance, the increase amount, and the decrease amount.

14. The management method according to claim 12, further comprising:
displaying the updated credit balance on the display unit after the processing the input, updating the balance of the credit based on the initial balance, the increase amount, and the decrease amount.

15. The management system according to claim 7,
wherein the second calculation unit further calculates a mass of each of the plastic films to be transferred based at least on a thickness, a width, a length, and a specific gravity of each of the plastic films.

16. The management system according to claim 7,
wherein the second calculation unit calculates the decrease amount based at least on a thickness, a width, a length, and a specific gravity of one of the plastic films to which the parameter is assigned.

17. The management system according to claim 7,
wherein the storage unit further stores product information in which identification information identifies a predetermined unit to which each of the plastic films belongs, the parameter as the percentage assigned to each of the plastic films, and a thickness, a width, and a length of each of the plastic films are associated with one another.

18. The management system according to claim 17, further comprising:
an output unit that outputs the product information to a physical label.

* * * * *